(12) United States Patent
Jeong (10) Patent No.: US 8,432,511 B2
(45) Date of Patent: *Apr. 30, 2013

(54) PLANE LIGHT SOURCE AND LCD BACKLIGHT UNIT HAVING THE SAME

(75) Inventor: Young June Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/037,934

(22) Filed: Mar. 1, 2011

(65) Prior Publication Data

US 2011/0211347 A1    Sep. 1, 2011

Related U.S. Application Data

(63) Continuation of application No. 12/153,194, filed on May 15, 2008, now Pat. No. 7,940,350.

(30) Foreign Application Priority Data

May 15, 2007    (KR) .......................... 10-2007-0046845

(51) Int. Cl.
G02F 1/1335    (2006.01)

(52) U.S. Cl.
USPC .......................................................... 349/62

(58) Field of Classification Search .............. 349/62
See application file for complete search history.

(56) References Cited

U.S. PATENT DOCUMENTS 7,002,546 B1    2/2006    Stuppi et al.
7,671,936 B2    3/2010    Chang
7,940,350 B2 *  5/2011    Jeong ........................ 349/62
2002/0047903 A1   4/2002   Shibuya et al.

(Continued)

FOREIGN PATENT DOCUMENTS

| EP | 1521235 A2 | 4/2005 |
| FR | 2789768 A1 | 8/2000 |

(Continued)

OTHER PUBLICATIONS

Japanese Office Action, dated Jan. 4, 2011, issued in Application No. 2008-127401.

(Continued)

*Primary Examiner* — Phu Vu
(74) *Attorney, Agent, or Firm* — Sughrue Mion, PLLC (57) ABSTRACT

There are provided a plane light source and an LCD backlight unit having the same. A plane light source having a plurality of light emitting devices arranged in a light emitting device matrix having rows and columns at a substrate according to an aspect of the invention includes a first matrix having a plurality of light emitting devices arranged in rows and columns; and a second matrix having a plurality of light emitting devices arranged in rows and columns, each of the light emitting devices located within a quadrangle formed by four neighboring light emitting devices included in the first matrix, wherein a pitch S between one light emitting device included in the light emitting device matrix and another light emitting device most adjacent to the one light emitting device satisfies the following equation to obtain uniform luminance distribution at a position distant from a light emitting surface of the light emitting device by an optical length l, $S \leq l \; 2 \times \tan(\theta/2 + \alpha)$, Equation where $-\pi/18 \leq \alpha \leq \pi/18$ is satisfied, and $\theta$ is an orientation angle of the light emitting device.

9 Claims, 8 Drawing Sheets

U.S. PATENT DOCUMENTS

| | | |
|---|---|---|
| 2005/0073495 A1 | 4/2005 | Harbers et al. |
| 2006/0244879 A1 | 11/2006 | Yoon et al. |
| 2006/0279671 A1 | 12/2006 | Han et al. |

FOREIGN PATENT DOCUMENTS

| | | |
|---|---|---|
| JP | 2003-331604 A | 11/2003 |
| JP | 2006-324134 A | 11/2006 |
| JP | 2007-042511 A | 2/2007 |
| JP | 2007-73295 A | 3/2007 |
| KR | 20-0361394 | 8/2004 |
| KR | 10-2004-0086604 A | 10/2004 |
| KR | 10-2006-0051465 | 5/2006 |
| WO | 00/49332 A1 | 8/2000 |

OTHER PUBLICATIONS

Korean Office Action, with English translation issued in Korean Patent Application No. KR 10-2007-0046845 dated on May 27, 2008.

Communication dated Dec. 16, 2011 from the Taiwanese Patent Office in counterpart Taiwanese application No. 97117391.

Rejection Decision issued Apr. 19, 2012 by the Taiwanese Patent Office in counterpart Taiwanese Application No. 097117391.

Extended European Search Report dated Mar. 21, 2011, in corresponding European Application No. 08251718.6.

Communication dated Nov. 27, 2012, issued by the Japanese Patent Office in counterpart Japanese Patent Application No. 2011-079106.

* cited by examiner

PRIOR ART

PLANE LIGHT SOURCE AND LCD BACKLIGHT UNIT HAVING THE SAME

CROSS-REFERENCE TO RELATED APPLICATIONS

This application claims the priority of Korean Patent Application No. 2007-0046845 filed on May 15, 2007, in the Korean Intellectual Property Office, the disclosure of which is incorporated herein by reference.

BACKGROUND OF THE INVENTION

1. Field of the Invention

The present invention relates to a plane light source and an LCD backlight unit having the same, and more particularly, to a plane light source that increases efficiency and reduces the number of light emitting devices by optimizing the arrangement and pitch of a plurality of light emitting devices, and an LCD backlight unit having the same.

2. Description of the Related Art

In general, cold cathode fluorescent lamps (CCFLs) that are used as light sources of liquid crystal displays (LCDs) according to the related art use mercury gas. For this reason, the CCFL may cause environmental contamination, has low response speed and lower color reproducibility, and may not lead to a reduction in size, thickness, and weight of an LCD panel.

Contrary to the CCFL, a light emitting diode (LED) is environment-friendly, has a response speed of several nanoseconds so as to achieve high-speed response and be effective for a video signal stream, and allows impulsive driving. Further, the LED has a color reproducibility of 100% or more, varies in luminance, color temperature, and the like by controlling the intensity of light of red, green, and blue LEDs, and can result in a reduction in size, thickness, and weight of the LCD panel. Accordingly, the LED has been widely used as a light source for the backlight unit of the LCD panel or the like.

The LCD backlight using the LEDs may be divided into an edge type backlight and a direct type backlight according to the position of a light source. In a case of the edge type backlight, a bar-shaped CCFL having width larger than length is positioned at the side thereof and emits light onto a front surface of the LCD panel by using a light guide panel. In a case of the direct type backlight, a plane light source is positioned at a lower part of the LCD panel, and light is directly irradiated to a front surface of the LCD panel from the plane light source that has almost the same area as the LCD panel.

Figure 1:
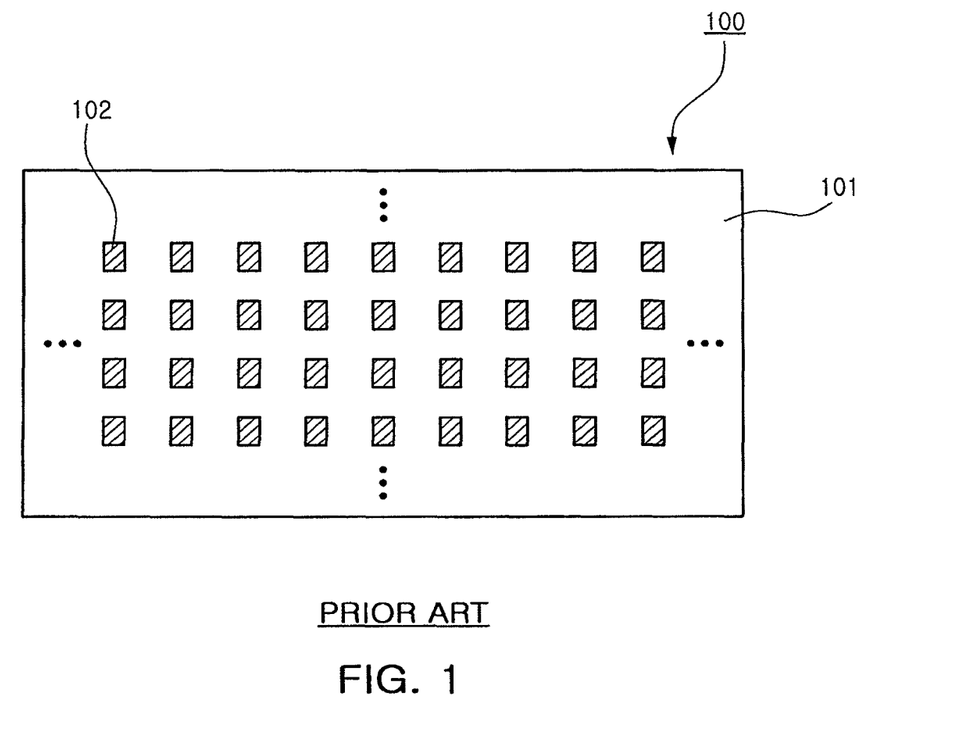
FIG. 1 is a schematic view illustrating an arrangement of light emitting devices of a plane light source according to the related art.

FIG. 1 is a view illustrating an arrangement of light emitting devices in a plane light source according to the related art.

As shown in FIG. 1, a plane light source 100 that is used in a direct type LCD panel according to the related art includes a plurality of LEDs 102 that are arranged in rows and columns at a substrate 101. Here, it may be considered that four neighboring LEDs 102 of the plurality of LEDs 102 form a rectangle.

However, such an arrangement requires a larger number of LEDs used to cover the same light emitting area than necessary.

Further, a difference in brightness between an area adjacent to each LED 102 and an area distant from the LED 102, specifically, the center of the rectangle formed by the four LEDs 102 may be large. That is, when a number of LEDs 102 are arranged, uniformity of brightness may be achieved. However, when the number of LEDs is reduced to improve efficiency as described above, the distance between the neighboring LEDs becomes larger. This may cause a change in brightness distribution.

Therefore, for a plane light source used in the LCD panel or the like, there is a need for a method of improving the performance of the plane light resource by reducing the number of light emitting devices used in the plane light source to cause little difference in brightness, that is, achieve uniformity of luminance.

SUMMARY OF THE INVENTION

An aspect of the present invention provides a plane light source that reduces the number of light emitting devices and increases efficiency by optimizing the arrangement and pitch of a plurality of light emitting devices, and an LCD backlight unit having the same.

According to an aspect of the present invention, there is provided a plane light source having a plurality of light emitting devices arranged in a light emitting device matrix having rows and columns at a substrate, the plane light source including: a first matrix having a plurality of light emitting devices arranged in rows and columns; and a second matrix having a plurality of light emitting devices arranged in rows and columns, each of the light emitting devices located within a quadrangle formed by four neighboring light emitting devices included in the first matrix, wherein a pitch S between one light emitting device included in the light emitting device matrix and another light emitting device most adjacent to the one light emitting device satisfies the following equation to obtain uniform luminance distribution at a position distant from a light emitting surface of the light emitting device by an optical length l, $$S \leq \frac{l}{2} \times \tan\left(\frac{\theta}{2} + \alpha\right), \qquad \text{Equation}$$

where $-\pi/18 \leq \alpha \leq \pi/18$ is satisfied, and $\theta$ is an orientation angle of the light emitting device.

The plane light emitting device may further include a diffusion sheet arranged along a light emitting path of the light emitting device.

The diffusion sheet may be separated from the light emission surface of the light emitting device by the optical length l.

Each of the light emitting devices included in the second matrix may be positioned at the center of the quadrangle.

The light emitting device may emit white light.

The pitch S between one light emitting device included in the light emitting device matrix and another light emitting device most adjacent to the one light emitting device may satisfy the above-described equation.

$\theta$ may be in the range of $110° \leq \theta \leq 130°$.

$\alpha$ may be in the range of $-\pi/90 \leq \alpha \leq \pi/90$.

The light emitting device is an LED.

According to another aspect of the present invention, there is provided an LCD backlight unit attached to a rear surface of an LCD panel, the LCD backlight unit including: the plane light source, a diffusion sheet provided toward an LCD panel close to the plane light source and uniformly diffusing light incident thereon from the plane light source, and at least one light collecting sheet provided toward the LCD panel close to the diffusion sheet and collecting the light diffused by the diffusion sheet in a direction vertical to a plane of the LCD panel.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Figure 2:
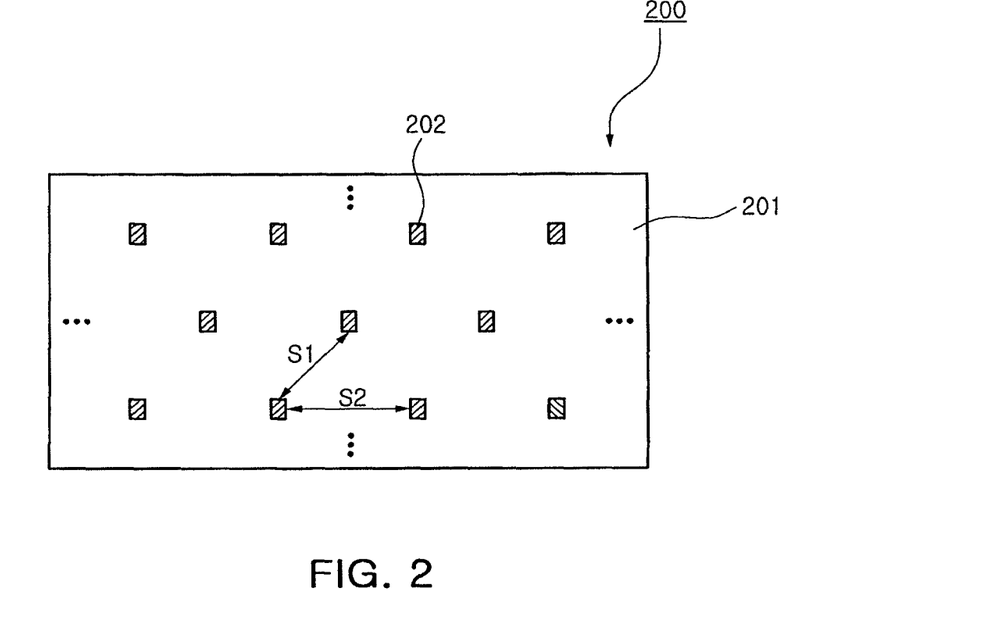
FIG. 2 is a schematic view illustrating an arrangement of light emitting devices of a plane light source according to an exemplary embodiment of the present invention.

FIG. 2 is a schematic view illustrating an arrangement of light emitting devices in a plane light source according to an exemplary embodiment of the invention.

A plane light source 200 according to this embodiment of the invention includes a plurality of light emitting devices 202 that are arranged at a substrate 201.

The light emitting devices 202 are arranged in a matrix with rows and columns in a zigzag fashion. A second matrix having the same configuration as a first matrix is arranged within the first matrix that has a plurality of light emitting devices arranged in rows and columns that are arranged in a straight line. Specifically, the first matrix has the light emitting devices arranged in rows and columns in a straight line, and each of the light emitting devices included in the second matrix is positioned inside a quadrangle formed by four neighboring light emitting devices included in the first matrix.

In order to improve the uniformity of luminance and luminous efficiency of the plane light source, the arrangement and pitch of the light emitting devices of the first and second matrices may be different from each other.

As described above, since the columns of the light emitting devices are not arranged in a straight line but in a zigzag line, the number of light emitting devices can be reduced by about 15 to 25% for the same light emitting area.

Meanwhile, the light emitting devices 202 are not particularly limited, but LEDs may be used as the light emitting devices 202. Devices that emit white light are preferably adopted so that the devices can be widely used as light sources.

In this embodiment, in addition to the above-described method of arranging the plurality of light emitting devices, pitches S1 and S2 between the neighboring light emitting devices 202 of the plane light source 200 are optimized to ensure uniformity of luminance of the plane light source 200. In this case, a pitch S between one light emitting device 202 and a light emitting device most adjacent to the one light emitting device 202 may be determined by the following Equation 1.

$$S \leq \frac{l}{2} \times \tan\left(\frac{\theta}{2} + \alpha\right) \quad \text{[Equation 1]}$$

In the Equation 1, l is an optical length, which may be understood as a distance by which light moves in a vertical direction from a light emitting surface of the light emitting devices 202. In this case, a diffusion sheet (not shown) may be arranged at a position corresponding to the optical length l to diffuse light. Further, in the Equation 1, $-\pi/18 \leq \alpha \leq \pi/18$ is satisfied, and $\theta$ is an orientation angle.

The Equation 1 is derived to make the luminance of the plane light source 200 uniform. A principle thereof will now be described.

Figure 3:
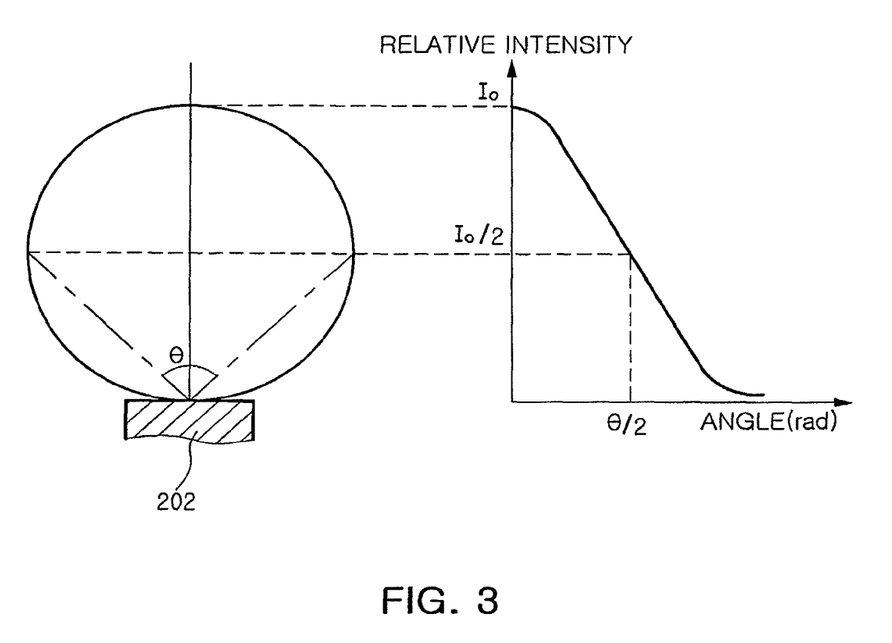
FIG. 3 is a view illustrating relative intensity with respect to divergence angle of light in a light emitting device.

First, meaning of the orientation angle used in the description of the invention will be described with reference to FIG. 3. FIG. 3 is a view illustrating relative intensity according to divergence angle of light in a light emitting device. Here, it may be considered that luminous intensity refers to luminous flux regardless of an incidence area of light.

As shown in FIG. 3, light emitted from the light emitting surface of the light emitting devices 202 to the outside is scattered off the light emitting surface at an angle of 0 to 180°. Here, maximum luminous intensity $I_0$ is obtained in an upper vertical direction with respect to the light emitting surface, and luminous intensity equal to half of the maximum luminous intensity $I_0$ is obtained at a predetermined angle. An orientation angle is within the range of the angle at which half of the maximum luminous intensity $I_0$ is obtained. In FIG. 3, the orientation angle is $\theta$.

The orientation angle depends on structural characteristics of the light emitting devices 202. In light emitting devices having a general structure, the orientation angle may be in the range of 110 to 130°. However, even when the orientation angle is not in the range, conditions of the Equation 1 according to the embodiment of the invention can be satisfied.

Figure 4:
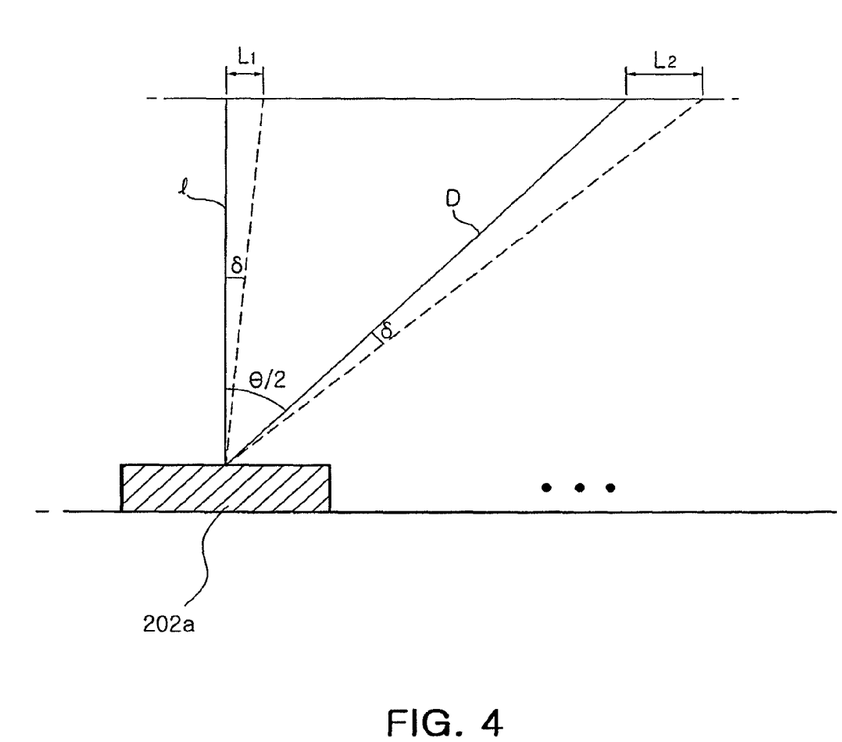
FIG. 4 is a view illustrating luminance according to a distance from a light emitting device at a position distant from the light emitting device by an optical length.

FIG. 4 is a view illustrating luminance according to a distance from the light emitting device at a position distant from the light emitting device by the optical length l. In FIG. 4, half of the range of the orientation angle is only shown in consideration of the symmetrical configuration of FIG. 3.

As described above, the light emitted from the light emitting device 202 is scattered in all directions. In FIG. 4, among emitted light components, a light component emitted in the upper vertical direction and a light component emitted at an angle of $\theta/2$ with respect to the upper vertical direction reach a diffusion sheet (not shown) that is separated from the light emitting device 202 by the optical length l.

In this embodiment, as described above, the luminous intensity, shown in FIG. 3, does not take the incidence area of light into consideration, a value obtained by dividing intensity flux by light incidence area is practically used as luminance to indicate luminous intensity.

First, the light emitted in the upper vertical direction moves along the optical length l and reaches the diffusion sheet. In consideration of light emitted within a small angle range δ, a length L1 along which the light in the angle range δ is incident upon the diffusion sheet may be approximated to l×δ. At this time, it is assumed that the length l along which light moves is much greater than the angle δ. Therefore, an area where the light emitted in the upper vertical direction is incident upon the diffusion sheet is L1×L1, and luminance $L_0$ is $I_0/(l \times \delta)^2$.

In the same manner, when the luminance of light emitted at an angle of θ/2 at the diffusion sheet is calculated, a distance D along which the emitted light reaches the diffusion sheet may be approximated to $l/\{\cos(\theta/2)\}$, and a length L2 along which the emitted light is incident upon the diffusion sheet is $l \times \delta/\{\cos(\theta/2)\}$. Further, an area where the light emitted at the angle of θ/2 is made incident upon the diffusion sheet is L2×L2, which is equal to $(l \times \delta)^2/\{\cos(\theta/2)\}^2$. Therefore, luminance with respect to the angle of θ/2 is $I_0 \times \{\cos(\theta/2)\}^2/\{2 \times (l \times \delta)^2\}$. This would be expressed as luminance in the upper vertical direction of $L_0/2 \times \{\cos(\theta/2)\}^2$.

Figure 5:
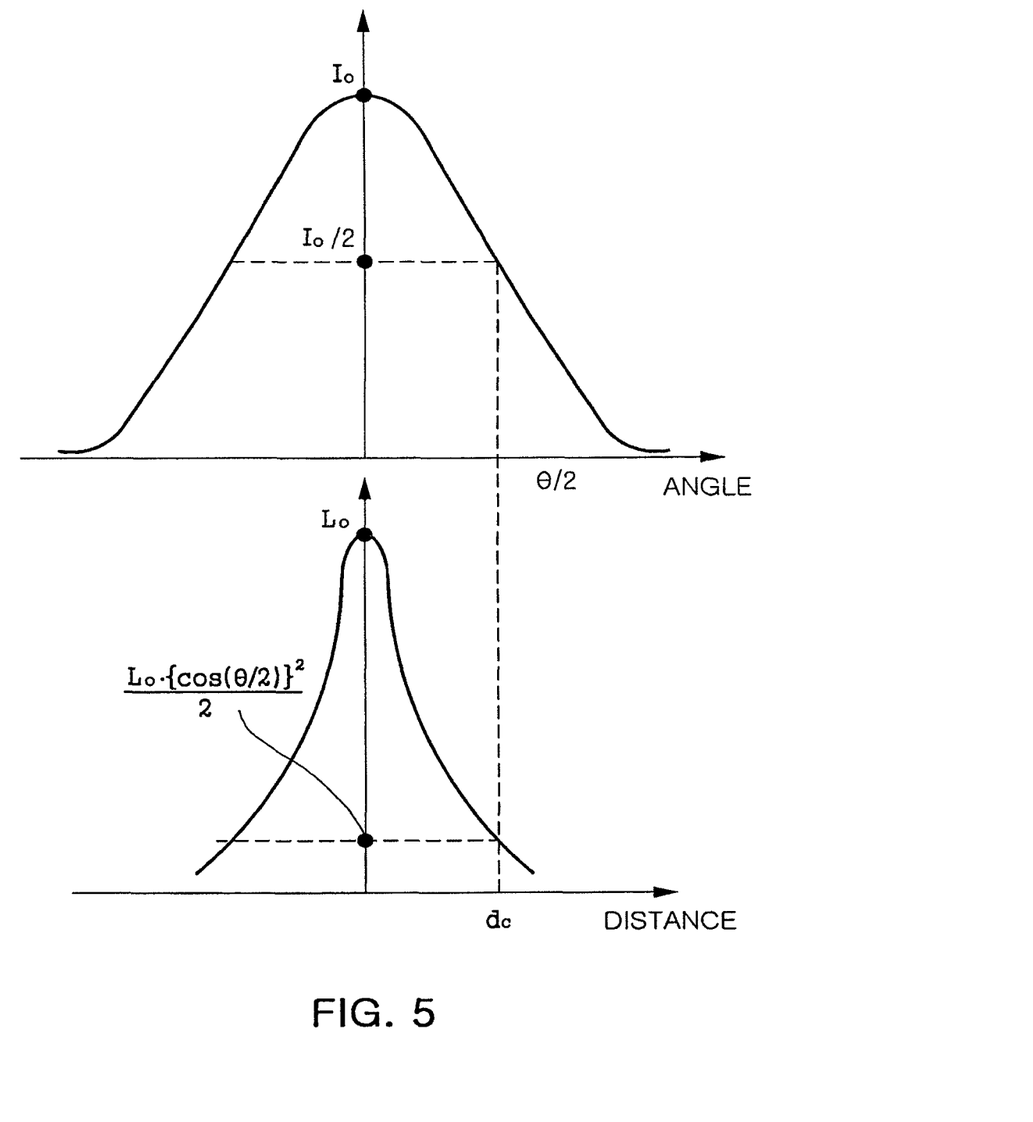
FIG. 5 is a view illustrating changes in light flux and luminance in an optical sheet according to a light emission angle and a horizontal distance in the light emitting device, respectively.

As described above, the luminous flux of the light emitted at the angle of θ/2 has half of the size of the light flux of the light emitted in the upper vertical direction. When the light emitted at the angle of θ/2 moves up to the diffusion sheet, which may be a target to achieve uniformity of luminance, a much lower luminance is obtained. This will be described with reference to FIG. 5. FIG. 5 is a view illustrating changes in luminous flux and luminance in a diffusion sheet according to a light emission angle and a horizontal distance in the light emitting device, respectively.

As shown in FIG. 5, relative luminance of the light emitted at the angle of θ/2 is much lower than half of the maximum value. This is because $\{\cos(\theta/2)\}^2$ is less than 1. For example, when θ is 120° as an orientation angle that may be generally considered, the relative luminance is only one eighth of the maximum value. In FIG. 5, a distance indicated by $d_c$ is a distance by which the light emitted at the angle of θ/2 moves in a horizontal direction with respect to the light emitting device 202 before the light reaches the diffusion sheet. The distance $d_c$ has a value of $l/\{\tan(\theta/2)\}$.

Therefore, when the distance between the neighboring light emitting devices is adjusted to improve uniformity of luminance in the plane light source w the plurality of light emitting devices are arranged, if the two neighboring light emitting devices are separated from each other by the distance of $2d_c$ relative luminance obtained in the middle of the light emitting devices by adding luminance values of both of the light emitting devices is much less than 1. That is, in order to improve the uniformity of luminance of the plane light source, uniform luminance distribution needs to be provided at the position corresponding to the optical length l. Therefore, a value obtained by adding the relative luminance values of the two neighboring light emitting devices needs to approximate to 1 but has a value much smaller than 1. For example, when θ is 120°, the value is ¼(⅛+⅛).

Therefore, the neighboring light emitting devices need to be closer to each other. A detailed description thereof will be made with reference to FIG. 6.

Figure 6:
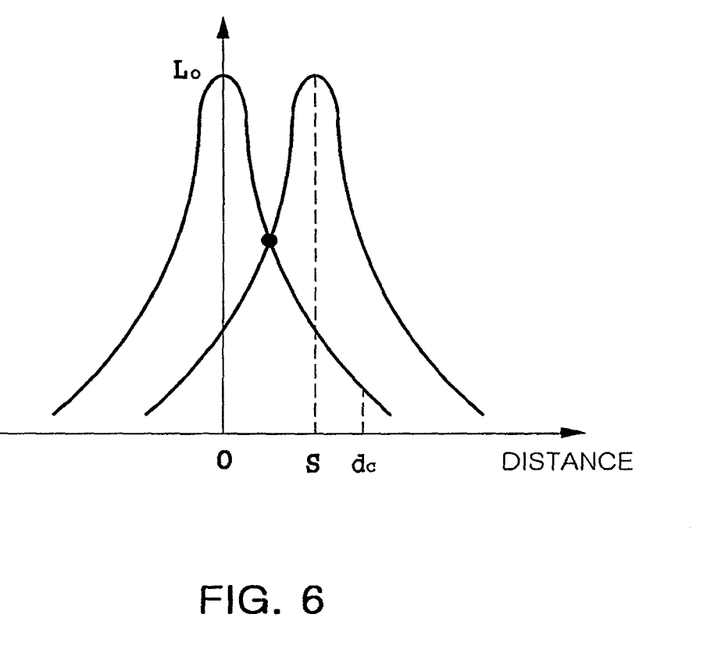
FIG. 6 is a view illustrating luminance distribution of two neighboring light emitting devices separated from each other by a distance S.

FIG. 6 is a view illustrating luminance of two neighboring light emitting devices distant from each other by a pitch S. Referring to FIG. 6, when the two light emitting devices are separated from each other by the pitch S, a point at which relative luminance of one light emitting device is ½ is almost the same as at point at which relative luminance of the other light emitting device is ½. Therefore, as compared when the pitch S is larger than the distance $d_c$, the uniformity of luminance is significantly improved.

In this case, a range of the value S may be appropriately controlled to about half of the range of the value $d_c$. Since the distance $d_c$ is $l/\{\tan(\theta/2)\}$, an equation similar with the Equation 1 may be obtained.

Meanwhile, even though the description has been made of the case in which light components of the two light emitting devices are combined, since a great number of light emitting devices are arranged in the plane light source, influences of other distant light emitting devices need to be considered. That is, even when the neighboring light emitting devices are separated from each other by a distance an upper vertical direction more or less larger than the pitch S of FIG. 6, uniform luminance may be obtained.

Therefore, in this embodiment, the angle can be controlled within a range close to the orientation angle. Therefore, such an equation as the Equation 1 may be proposed. In this case, the value α, which is a factor serving as the control method, is in the range of $-\pi/18 \leq \alpha \leq \pi/18$. The most desirable value that is obtained from the structure, shown in FIG. 2, through experiments is approximately π/90. In this embodiment, the value α may vary according to the orientation angle of the light emitting device, the pitch between the light emitting devices, and the arrangement of the light emitting devices.

The above-described plane light source according to the embodiment of the invention may be used in an LCD backlight unit 300 that emits rear light of an LCD panel.

Figure 7:
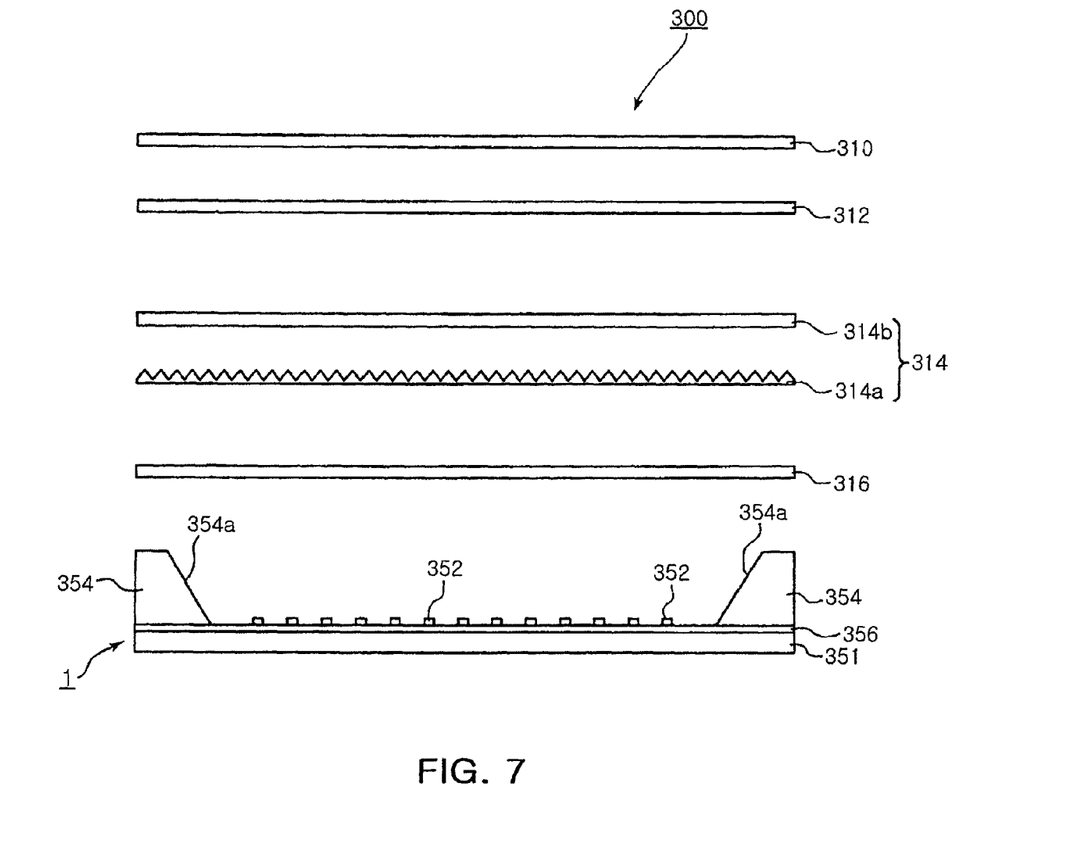
FIG. 7 is an exploded side view illustrating an LCD backlight unit 300 according to an exemplary embodiment of the invention.

FIG. 7 is an exploded side view illustrating the LCD backlight unit 300 according to another exemplary embodiment of the invention. As shown in FIG. 7, the LCD backlight unit 300 that is attached to the rear of the LCD panel has the above-described plane light source 1 according to the embodiment of the invention and a diffusion sheet 316. The diffusion sheet 316 is provided toward an LCD panel 310 close to the plane light source 1 and uniformly diffuses light incident thereon from the plane light source 1.

Further, the LCD backlight unit 300 includes at least one light collecting sheet 314. The at least one light collecting sheet 314 is provided toward the LCD panel 310 close to the diffusion sheet 316 and collects light, diffused by the diffusion sheet 316, in a vertical direction with respect to the plane of the LCD panel 310. The LCD backlight unit 300 may further include a protector sheet 312. The protector sheet 312 is disposed at the light collecting sheet 314 and protects an optical structure under the protector sheet 312.

Further, the plane light source 1 includes a substrate 351 and a plurality of light emitting devices 352 that are arranged in a matrix at the substrate 351. The plane light source 1 may further include a side wall 354 and a reflective layer 356. The side wall 354 is formed at the edge of an upper surface of the substrate 351 to encompass the light emitting devices 352 arranged in the matrix. Also, the side wall 354 has inclined surfaces in a direction in which the light emitting devices 352 are arranged. The reflective layer 351 is formed at the upper surface of the substrate 351 and reflects light emitted from the light emitting devices 352 upwards.

Preferably, a reflective material 354a is applied to the inclined surfaces of the side wall 354 to emit light, emitted toward the side, upwards.

The diffusion sheet 316 located above the plane light source 1 diffuses light incident thereon from the plane light source 1 to thereby prevent a partial concentration of light. Further, the diffusion sheet 316 adjusts a direction of light moving toward the first light collecting sheet 314a to reduce an angle of inclination with respect to the first light collecting sheet 314a. As described above, the distances between the light emitting devices 352 included in the plane light source 1 and the diffusion sheet 316 correspond to the optical length l in the Equation 1, and therefore, the distance therebetween may be determined according to the arrangement of the light emitting devices 352. Inversely, the arrangement of the light emitting devices 352 may be determined according to the distances between the light emitting devices 352 and the diffusion sheet 316.

Each of the first light collecting sheet 314a and the second light collecting sheet 314b includes triangular prisms arranged in a predetermined manner on an upper surface thereof. The prisms of the first light collecting sheet 314a are arranged at a predetermined angle (for example, 90°) with respect to those of the second light collecting sheet 314b. Each of the first and second light collecting sheets 314a and 314b collects light diffused by the diffusion sheet 316 in a direction vertical to the plane of the LCD panel 310. In this way, desirable vertical incidence of light passing through the first and second light collecting sheets 314a and 314b with respect to the protector sheet 312 is obtained. Most of the light passing through the first and second light collecting sheets 314a and 314b moves in a vertical direction to obtain uniform luminance distribution in the protector sheet 312. In FIG. 7, the two light collecting sheets are used as one example. However, one light collecting sheet may be only used.

The protector sheet 312 that is formed above the second light collecting sheet 314b protects the surface of the second light collecting sheet 314b and at the same time, diffuses light to obtain uniform distribution of light. The LCD panel 310 is formed above the protector sheet 312.

As such, the LCD backlight unit 300 according to this embodiment that uses the plane light source 1 to obtain uniform luminance distribution of emitted light can reduce a change in brightness according to regions of the LCD panel.

Figure 8A:
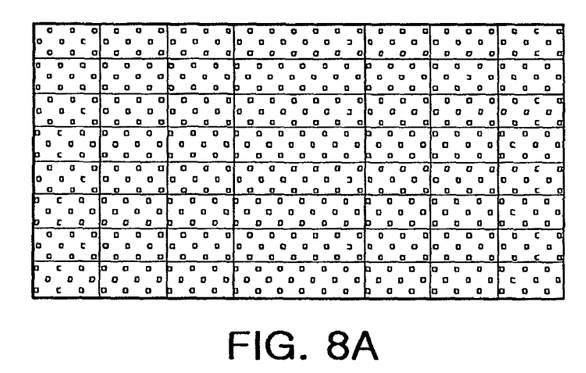
FIGS. 8A, 8B, and 8C are views illustrating an arrangement of light emitting devices and luminance distribution to make a comparison between a plan light source according to an embodiment of the present invention and the light emitting device according to the related art.
Figure 8B:
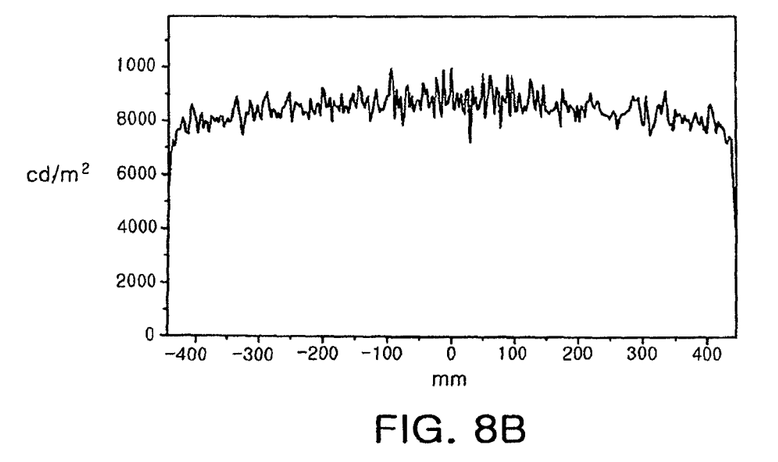
Figure 8C:
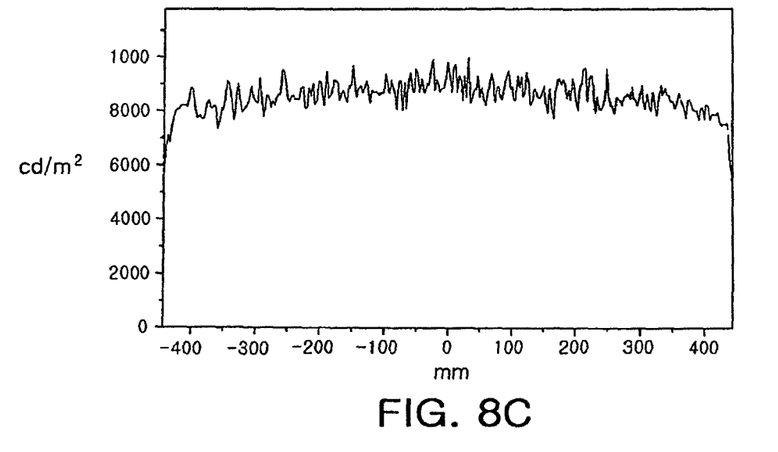

Finally, FIG. 8 is a view illustrating a comparison in uniformity of luminance between the plane light source according to the embodiment of the invention and a plane light source according to the related art.

First, an arrangement of light emitting devices, shown in FIG. 8A, is the same as the arrangement described in FIG. 2. The distance between the light emitting devices satisfies the Equation 1. Further, for experiments, the plane light source having the arrangement, shown in FIG. 2, is used in a 40-inch backlight unit like FIG. 7. When the 40-inch backlight unit uses the plane light source having the arrangement, shown in FIG. 2, the number of light emitting devices can be reduced by approximately 25% as compared with the number of light emitting devices according to the related art.

FIG. 8B is a view illustrating luminance distribution of light emitted from the plane light source according to the related art, shown in FIG. 1, along a direction vertical to a light emitting direction. FIG. 8C is a view illustrating a result of the embodiment of FIG. 8A. Here, it may be understood that a horizontal axis of each of the graphs of FIGS. 8B and 8C indicates distances in right and left directions on the basis of a predetermined light emitting device like FIGS. 4 to 6.

Referring to FIGS. 8B and 8C, the plane light source according to this embodiment of the invention shows almost the same luminance intensity as that of the related art. Considering the fact that the number of light emitting devices is reduced by approximately 25%, it can be seen that efficiency is significantly improved than before.

Further, even though the reduced number of light emitting devices causes an increase in average distance between the light emitting devices as compared with the related art, uniformity of luminance distribution is not reduced at all, but rather, the uniformity of luminance distribution is improved than before.

As set forth above, according to the exemplary embodiments of the invention, it is possible to provide a plane light source that reduces the number of light emitting devices and increases efficiency by optimizing the arrangement and pitch of a plurality of light emitting devices and an LCD backlight unit having the same. Further, according to the embodiments of the invention, the plane light source can obtain uniform luminance.

While the present invention has been shown and described in connection with the exemplary embodiments, it will be apparent to those skilled in the art that modifications and variations can be made without departing from the spirit and scope of the invention as defined by the appended claims.

What is claimed is:

1. A plane light source having a plurality of light emitting devices arranged in a light emitting device matrix having rows and columns at a substrate, the plane light source comprising:

a first matrix having a plurality of light emitting devices arranged in rows and columns; and a second matrix having a plurality of light emitting devices arranged in rows and columns, wherein at least one of the rows of the first matrix is disposed to be shifted in relation to at least one of the rows of the second matrix in order to form a zigzag structure, and a pitch S between one light emitting device included in at least a portion of the light emitting device matrix and another light emitting device most adjacent to the one light emitting device satisfies the following equation to obtain uniform luminance distribution at a position distant from a light emitting surface of the light emitting device by an optical length l, $$S \le \frac{l}{2} \times \tan\left(\frac{\theta}{2} + \alpha\right), \quad \text{Equation}$$

where $-\pi/18 \le \alpha \le \pi/18$ is satisfied, and $\theta$ is an orientation angle of the light emitting device.

2. The plane light emitting device of claim 1, further comprising: a diffusion sheet arranged along a light emitting path of the light emitting device.

3. The plane light emitting device of claim 2, wherein the diffusion sheet is separated from the light emission surface of the light emitting device by the optical length l.

4. The plane light emitting device of claim 1, wherein each of the light emitting devices included in the second matrix is positioned at the center of the quadrangle.

5. The plane light emitting device of claim 1, wherein the light emitting device emits white light.

6. The plane light emitting device of claim 1, wherein the pitch S between one light emitting device included in the light emitting device matrix and another light emitting device most adjacent to the one light emitting device satisfies the above-described equation.

7. The plane light emitting device of claim 1, wherein $\theta$ is in the range of $110° \le \theta \le 130°$.

8. The plane light emitting device of claim 1, wherein $\alpha$ is in the range of $-\pi/90 \le \alpha \le \pi/90$.

9. The plane light source of claim 1, wherein the light emitting device is an LED.

* * * * *